(12) United States Patent
Mishra et al.

(10) Patent No.: US 8,005,114 B2
(45) Date of Patent: Aug. 23, 2011

(54) METHOD AND APPARATUS TO VARY THE TRANSMISSION BIT RATE WITHIN INDIVIDUAL WIRELESS PACKETS THROUGH MULTI-RATE PACKETIZATION

(75) Inventors: Arunesh Mishra, Mountain View, CA (US); Suman Banerjee, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 144 days.

(21) Appl. No.: 12/555,353

(22) Filed: Sep. 8, 2009

(65) Prior Publication Data

US 2010/0067546 A1 Mar. 18, 2010

Related U.S. Application Data

(60) Provisional application No. 61/097,406, filed on Sep. 16, 2008, provisional application No. 61/095,216, filed on Sep. 8, 2008.

(51) Int. Cl.
*H04J 3/16* (2006.01)

(52) U.S. Cl. ....................................................... 370/472

(58) Field of Classification Search .......... 370/203–207, 370/278–282, 349, 464, 465, 470–476
See application file for complete search history.

(56) References Cited

U.S. PATENT DOCUMENTS 7,463,583 B2 * 12/2008 Hamdi .......................... 370/231

OTHER PUBLICATIONS

Rayanchu et al, Supporting Continuous Mobility through Multi-rate Wireless Packetization, ACM, 5 pages, 2008.*
Wong et al, Robust Rate Adaptation for 802.11 Wireless Networks, ACM, 12 pages, 2006.*
Holland, Gavin, et al., A Rate-Adaptive MAC Protocol for Wireless Networks, pp. 1-9, Aug. 7, 2000, Technical Report TR00-019, Department of Computer Science, Texas A&M University, College Station, Texas, USA.

* cited by examiner

*Primary Examiner* — Frank Duong
(74) *Attorney, Agent, or Firm* — Boyle Fredrickson, S.C.

(57) ABSTRACT

A transceiver for wireless data transmission provides for variable bit rates within a packet (intra-packet rate changes) to provide a high-speed adaptation to variations in link quality useful for continuous mobility applications. Intra-packet rate variations may be obtained with standard hardware by remapping payload data to a subset of the hardware transmission constellation symbols.

24 Claims, 5 Drawing Sheets

METHOD AND APPARATUS TO VARY THE TRANSMISSION BIT RATE WITHIN INDIVIDUAL WIRELESS PACKETS THROUGH MULTI-RATE PACKETIZATION

CROSS REFERENCE TO RELATED APPLICATIONS

This application claims the benefit of U.S. provisional applications 61/097,406 filed Sep. 16, 2008 and 61/095,216 filed Sep. 8, 2008, both hereby incorporated by reference.

STATEMENT REGARDING FEDERALLY SPONSORED RESEARCH OR DEVELOPMENT

This invention was made with United States government support awarded by the following agencies:
NSF 0520152 and 0639434
The United States government has certain rights in this invention.

BACKGROUND OF THE INVENTION

The present invention relates to wireless transceivers for transmitting and receiving digital data and, in particular, to a transceiver system that varies the effective bit transmission rate within individual data packets or frames.

The connection of electrical devices to the Internet using wireless protocols, for example WiFi, has provided what may be termed "discrete mobility" to users of laptop computers and other devices. With discrete mobility, the user of the device is free to work at a variety of locations but typically suspends use of the device while moving between locations.

In providing discrete mobility, current wireless protocols adapt to different qualities of the wireless transmission link (for example, the amount of electrical interference in the transmission link or the signal strength of the transmission) at different locations by changing the transmission rate of the data packets and providing for retransmission of data packets that are corrupted. Generally, lower transmission rates provide improved transmission over noisy or low signal strength links In the retransmission of corrupted data packets, the corruption may be detected, for example, by error detection codes associated with each packet, or missing packet sequence numbers.

The discrete mobility offered by current wireless protocols is often inadequate for wireless devices such as phones and music players where the user expects "continuous mobility". Such continuous mobility requires a real-time Internet connection with low latency as the user moves between locations. Yet, measurements made by the present inventors using a mobile phone implementing voice over WiFi (VoWiFi) using standard transmission rate adaptation and retransmission mechanisms found that 80% of the data required retransmission.

SUMMARY OF THE INVENTION

The present invention provides a transmission protocol that varies the effective bit rate of the transmission within an individual packet. This intra-packet rate modulation permits a higher speed, pro-active adaptation to varying link qualities necessary for continuous mobility. Intra-packet rate modulation is rendered practical with standard wireless hardware by mapping transmitted data to a subset of possible wireless symbols. Wireless symbols are generally the different signaling events that may be transmitted by a transmitter to represent one or more bits. Different symbols may, for example, be distinguished by one or more of phase, frequency, amplitude or the like.

Using this approach, the actual bit rate of used by the hardware for a specific data transmission may remain unchanged as the logical bit rate is adjusted as a function of the position of a data bit in the packet. This approach also permits both intra- and inter-packet bit-rate adjustments, allowing the present invention to work with current inter-packet rate adaptation mechanisms.

Specifically then, the present invention provides a transceiver system for the transmission of packetized digital data. The transceiver includes a transmitter circuit that receives a first data payload and a first rate map describing a desired transmission bit rate of the data payload where the desired transmission bit rate varies as a function of bit positions in the first data payload. The trans-bitter transmits the first data payload according to the first rate map together with control information in a first packet.

The transceiver also includes a receiver circuit receiving a second packet including a second data payload and control information and decoding the second data payload according to a second rate map describing a transmission bit rate of the second data payload that varies as a function of bit positions in the second data payload.

It is thus a feature of the invention to permit intra-packet data rate modulation for high-speed adaptation to varying link quality incident to continuous mobility use of wireless devices or caused by variability in wireless link conditions from other moving objects such as people.

The transmitter circuit may transmit the first rate map in the first packet and the receiver may receive the second rate map from the second packet.

It is thus a feature of at least one embodiment of the invention to permit dynamic rate modulation on a packet-by-packet basis. By embedding the rate map in the packet, changes in the rate may be affected instantaneously with the transmission of each new packet.

The transmitter circuit may include an encoder circuit variably mapping payload data to transmission symbols according to the first rate map to produce a variable transmission bit rate. Similarly the receiver may include a decoder circuit variably mapping received symbol data to payload data according to the second rate map to decode the transmitted second payload.

It is thus a feature of at least one embodiment of the invention to provide a software level rate modulation permitting the present invention to work with standard hardware and be readily combined with current hardware-implemented rate adaptation systems.

The transceiver may further include a statistical payload error table recording a statistical probability of errors as a function of bit position in a payload and the bit rate encoder may encode the payload according to the packet error table to reduce bit rates at bit positions having high statistical probability of error and to increase bit rate at bit positions having low statistical probability of errors.

It is thus a feature of at least one embodiment of the invention to exploit the present inventors' discovery of a regular pattern of errors in spread-spectrum transceivers to anticipate those errors and thus improve data throughput by reducing mis-transmissions.

The transceiver may further include an error detector detecting variation in error rates as a function of bit rate within a packet having different intra-packet bit rates and monitoring the function to deduce an improved error-corrected transmission rate. The bit rate encoder may then encode a payload according to the improved error-corrected transmission rate.

It is thus a feature of at least one embodiment of the invention to use an individual packet and its varying bit rates to accurately deduce an ideal bit rate for a later packet. The varying bit rate packet provides an indication of not only when the bit rate is too high for the channel but also when the bit rate is too low for the channel.

The bit rate encoder may vary the transmission bit rate within the first packet to provide transmission bit rates on either side of the improved transmission rate.

It is thus a feature of at least one embodiment of the invention to continually bracket the optimal transmission rate to provide rapid adaptation to link degradation.

The transmitter and receiver may provide for a transmitted symbol constellation and the transmitter may vary the transmission bit rate by using only a subset of the symbols of the constellation, the subset size being a function of the desired bit rate. The receiver may employ an error corrector re-mapping data received at constellation points outside of the subset to constellation points within the subset.

It is thus a feature of at least one embodiment of the invention to capture the improved error correction qualities incident to lower transmission rates using a reduced constellation subset.

These particular features and advantages may apply to only some embodiments falling within the claims and thus do not define the scope of the invention.

DETAILED DESCRIPTION OF THE PREFERRED EMBODIMENT

Figure 1:
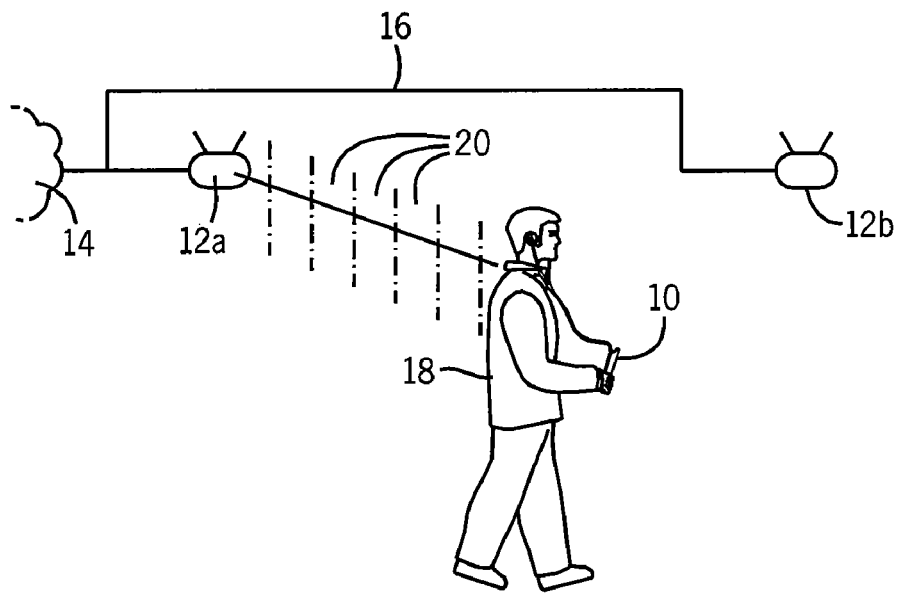
FIG. 1 is a simplified diagram showing a mobile user moving between two stationary access points showing zones in which different transmission bandwidth will be available to the user's mobile device.

Referring now to FIG. 1, a mobile device 10, such as an Internet phone or Internet connected music player, may employ a wireless protocol such as 802.11 based WiFi to communicate with one or more access points 12a and 12b. The access points 12a and 12b may be connected to the Internet 14, for example, by physical conductors 16.

As a user 18 moves away from a given access point 12a, he or she will pass rapidly through multiple zones 20 having different link quality with the access point 12a as measured by link bandwidth. As used herein, "bandwidth" generally refers to the achievable rate of transmission of data by the link in the zone 20 as may be affected by signal strength, channel noise, and other interference such as multi-path reflections.

Figure 2:
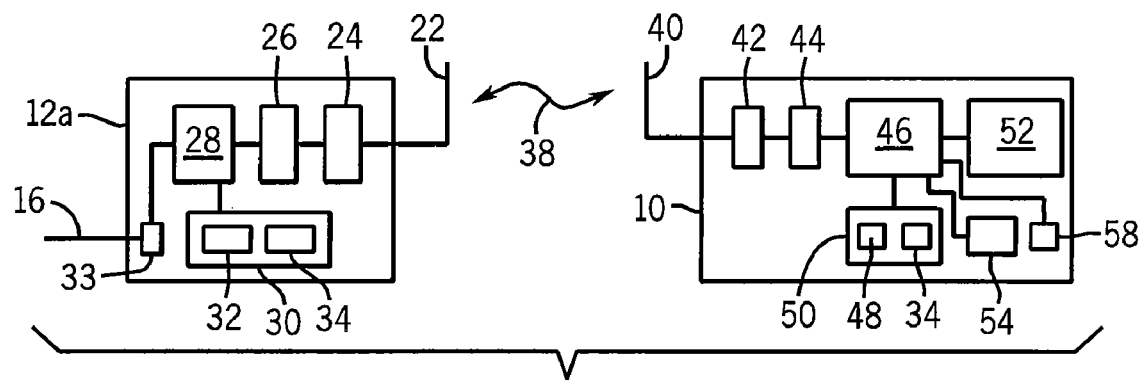
FIG. 2 is a block diagram of the principal components of an access point and mobile device implementing transceivers suitable for use with the present invention.

Referring now to FIG. 2, each access point 12 may provide an antenna 22 leading generally to transceiver circuitry 24. The transceiver circuitry 24 may use any of a variety of different modulation techniques such as Orthogonal Frequency Division Multiplexing (OFDM) including, for example, Quadrature Amplitude Modulation (QAM) such as 16-QAM, or phase-based methods such as QPSK and BPSK as well as others. Normally the transceiver circuitry 24 will implement a spread-spectrum technique in which the carrier signal is spread in the frequency domain to reduce susceptibility to interference. The transceiver circuitry 24 provides both a transmitter and receiver for modulation and demodulation, respectively, according to these modulation techniques.

The transceiver circuitry 24 may be connected to a network protocol circuit 26 implementing the wireless protocol, for example 802.11, or other wireless standards as is generally understood in the art.

The network protocol circuit 26 may, in turn, connect with a processor 28 communicating with a memory 30 holding an operating system 32 and other programs needed for the access point 12 as well as program 34 implementing the present invention. The processor 28 may also connect with a standard network interface circuit 33 communicating with conductors 16. The transceiver circuitry 24, network protocol circuit 26, and processor 28 together form a transceiver system.

As described above, during operation, the access point 12 communicates with the mobile device 10 by means of radio signals 38 coupled between the antenna 22 of the access point 12 and antenna 40 of mobile device 10. The antenna 40 of mobile device 10 leads to a transceiver circuitry 42 similar to transceiver circuitry 24 which in turn connects with a network protocol circuit 44 also generally identical to corresponding and network protocol circuit 26. Again, a processor 46 may connect to the network protocol circuit 44 and execute an operating system 48 providing the basic functionality of the mobile device 10 and a program 34 for the present invention held in a memory 50. The transceiver circuitry 42, network protocol circuit 44, and processor 46 together form a transceiver system.

Depending on the purpose of the mobile device 10, the mobile device 10 may also have a display screen 52 and user input device 54 such as the touch screen or button array or the like, both communicating with the processor 46. An I/O port 58, for example, providing for audio output or input may also communicate with the processor 46 to implement phone or music player features.

Figure 3:
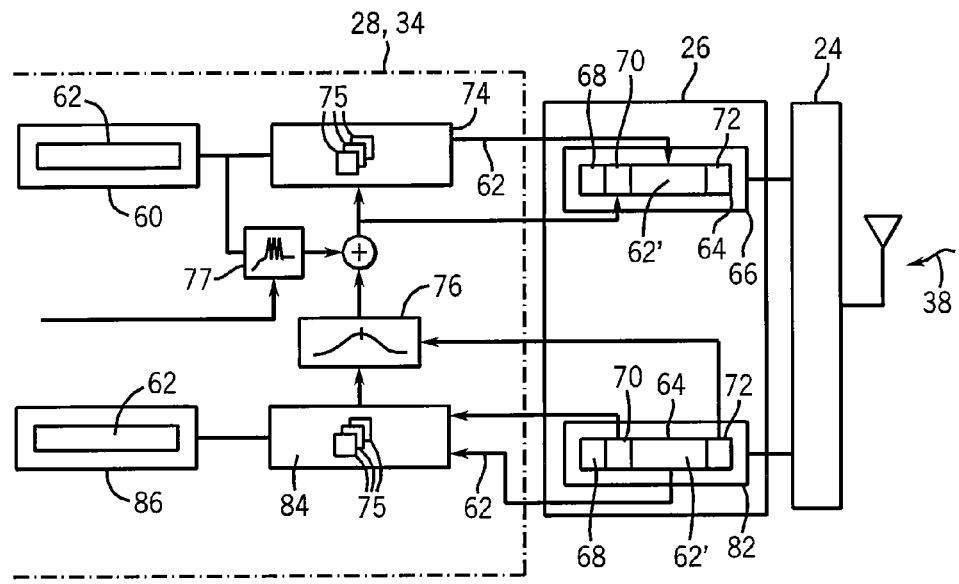
FIG. 3 is a detailed block diagram of the transceivers of FIG. 2 having a programmable processor working with standard wireless hardware, together implementing a bit spreader and a bit de-spreader.

Referring now to FIG. 3, the present invention as described may be implemented in software 34 executed by processors 28 and 46 and thus provides a simple migration path for implementing this protocol. Nevertheless, it must be understood, that the software functions may alternatively be implemented in hardware elements 26, 24, 42, 44 as the technique of the present invention gains acceptance.

Because the circuitry involved in the transmission of the radio signal 38 is similar for mobile device 10 and access point 12, only access point 12 will be described now, with it being understood that a similar description applies to the corresponding elements of the mobile device 10.

A transmission by access point 12a begins with the receipt by the processor 28, within a buffer 60, of data forming an unmodified payload 62 to be transmitted. The unmodified payload 62, for example, may be audio data (music or spoken words) or text data, or other data, provided from the Internet or from the device itself according to the particular context. The unmodified payload 62 will be modified, as will be described, to produce modified payload 62' forwarded to a buffer 66 in the network protocol circuit 26. Within the network protocol circuit 26, the modified payload 62' is concatenated with control data 68, 70 and 72 to produce a data packet 64 to be transmitted by the transceiver circuitry 24. The term "data packet" as used herein is generally a payload as will be transmitted with a single set of common control data 68, 70, and 72. The control data, 68, 70 and 72 will typically include a header 68 holding a destination, data type, synchronization clock sequence, and sequence number for the data packet 64, a rate table 70 related to interpretation of a variable bit rate of the data packet 64 added by the present invention, and error correction and/or detection codes 72. Control data 68 and 72 is well-known in the art and control data 70 will be described further below.

Between the buffer 60 receiving the unmodified payload 62 and the buffer 66 holding the data packet 64 ready for transmission, the present invention employs an encoder 74 providing for a bit-spreading operation that converts the unmodified payload 62 to a modified payload 62'.

Figure 6:
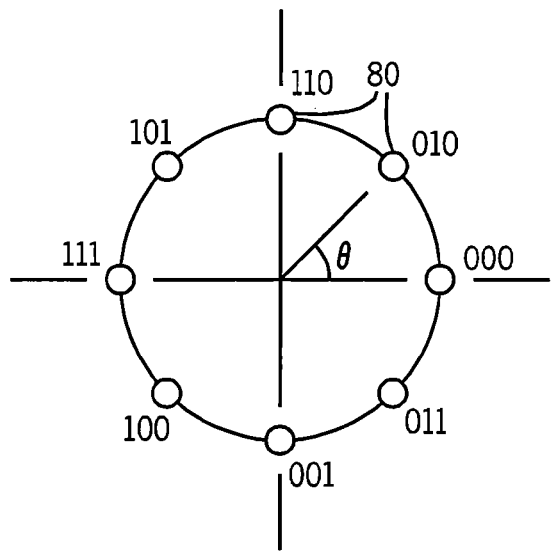
FIG. 6 is a constellation diagram of the QAM wireless symbols.

Referring momentarily to FIG. 6, each transmitter of transceiver circuitry 24 will provide for a series of symbols 80, typically representing various modulation states of the radio signal 38, for example phase or frequency modulation, that may be uniquely decoded by a corresponding transceiver. An example constellation for quadrature phase shift (QPSK) is depicted consisting of eight symbols 80 defined by instantaneous phase shifts of two quadrature radiofrequency signals. This modulation system may be termed 8-PSK and allows the instantaneous transmission of three bits (a triplet) of data. These symbols 80 are depicted as locations on a circle defined by a phase angle θ having angles of 0° to 360° with the symbols 80 separated by 45° increments. The relationship between the symbols 80 and the given triplets may follow a Gray-code sequence in which successive triplets differ by only a single bit. Thus, starting at angle θ and proceeding counterclockwise around the circle, the symbols 80 map to triplets as follows: 000, 010, 110, 101, 111, 100, 001, and 011.

In one embodiment of the present invention, the effective data rate of the transmitter (with respect to the communication of data of the unmodified payload 62) may be decreased by mapping the unmodified payload 62 to a subset of the symbols 80. With this three mapping, even though the transmitter transmits a constant number of symbols per second, the number of bits of the unmodified payload 62 transmitted per second may be decreased.

Figure 5:
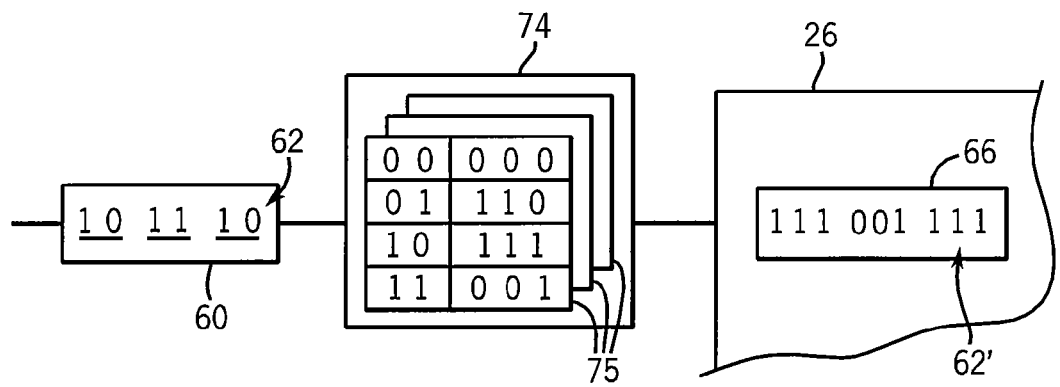
FIG. 5 is a detailed block diagram of the bit spreader for Quadrature Amplitude Modulation (QAM) hardware.

Referring also to FIG. 5, consider for example the subset of symbols 80 including only the triplets: 000, 110, 111, and 001. A mapping table 75 may be generated as follows:

| Payload data | Symbol |
| --- | --- |
| 00 | 000 |
| 01 | 110 |
| 10 | 111 |
| 11 | 001 |

For example, unmodified payload 62 of 101110 may be mapped using mapping table 75 to the modified payload 62' equal to 111 001 111. This can be compared to straight transmission of unmodified payload 62 implemented by the symbols 101 110. The bit-spreading operation of encoder 74 thus reduces the effective rate of transmission of the data by approximately two thirds. Further, this reduction can be implemented without modification of the transceiver circuitry 24 or network protocol circuit 26, but simply by modifying the payload before it is transmitted.

While one example of a bit-spreading operation is shown, it will be understood from this example that different degrees of bit-spreading may be implemented simply by selecting among different mapping tables 75. For example, a further decrease in effective transmission rate may be obtained by remapping of 0 in the payload to the 000 symbol and 1 in the payload to the 111 symbol. In addition, mapping tables 75 may be developed for other modulation schemes by simply selecting subsets of the symbols 80 of those modulation schemes and assigning them to elements of the unmodified payload 62 using mapping table 75.

Referring again to FIG. 3, in the present invention, the encoder 74 uses different mapping tables 75 to change the effective bit transmission rate as a function of the bit number in the unmodified payload 62. Thus, different bits in the unmodified payload 62 may have different effective transmission rates. For example, the first three bits 101 may be mapped to the symbol 101 without compression while the next two bits 11 may be mapped 2001 as shown in FIG. 5 producing a compression by two thirds. The last bit 0 may be mapped to 000 producing compression by one third. In this way, three different effective transmission rates of these bits may be realized. As shown in FIG. 3, the particular compression function (compression as a function of bit number) is captured and stored as a rate table 70 concatenated to the modified payload 62' as will serve in assisting the decoding of the packet 64.

The particular function used by the encoder 74 may be generated in a variety of ways which will be discussed further below.

Referring still to FIG. 3, the decoding of the packet 64 arriving at the transceiver circuitry 24 follows the reverse procedure as described above. After a data packet is received by the transceiver circuitry 24 and provided to a buffer 82 in the network protocol circuit 26, the header 68 and error correction and/or detection codes 72 are removed from the modified payload 62' and processed according to techniques well known in the art. The error correction and/or detection codes 72 may indicate an erroneous modified payload 62' which may be used independently to provoke a retransmission of the packet 64 or a correction of the erroneous data. In either case, the bit number of the error identified may be forwarded to an error-histogram 76 which will be described below.

A modified payload 62' that is free from errors is passed to a decoder 84 which also receives the rate table 70. The decoder 84 implements a bit-spreader which reads the rate table 70 and performs a recompression operating analogously to the bit-spreading described above with respect to the encoder 74 but with the mapping conducted in reverse. The particular mapping is determined by the rate table 70 so that a subset of the possible symbols 80 is mapped (by a mapping table 75) to produce unmodified payload 62. This unmodified payload 62 is provided to a buffer 86 to be further processed according to the context of the device, for example, to be transmitted on the Internet (for access point 12) or generate an audio signal on mobile device 10.

Figure 7:
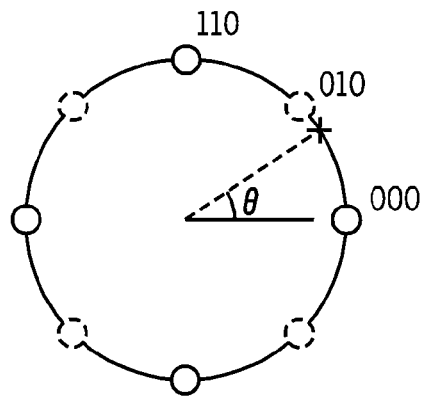
FIG. 7 is a figure similar to that of FIG. 6 showing mapping of data to be transmitted to a subset of the constellation of FIG. 6.

Referring momentarily to FIG. 7, the use of a limited subset of the symbols 80 allows for a second level of error correction (or detection) of the received data in a hardware implementation of the present invention. For example, assume that data is received at phase angle θ=43° shown by an X in FIG. 7. In this case, if the transceiver circuit 24 is aware of the particular subset of active symbols (shown in solid circles in FIG. 7) the transmitted data at 43° may be correctly resolved to the symbol 000 rather than the symbol 010 as may normally occur. Thus, the benefits of lower data rates by simple remapping can produce increased noise immunity.

Figure 8:
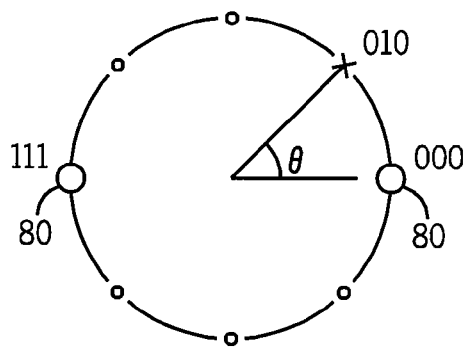
FIG. 8 is a figure similar to that of FIGS. 6 and 7 showing error correction possible with the remapping of the present invention.

Referring to FIG. 8, in certain cases this benefit of additional error correction (or detection) can be implemented purely in software after the transceiver circuitry 24. For example, when the subset of employed symbols 80 of 8-PSK are reduced to two, for example, 000 and 111, a symbol interpreted by the transceiver circuitry 24 to be symbol 010 may be confidently and easily corrected in software to symbol 000. Regardless of the error correction and detection, the bit-spreading operation may improve the reliability of the transmission by the distribution of the data of the unmodified payload 62 to a greater number of bits decreasing the chance of corruption on a per bit basis because of the independent statistical probability of corruption each transmitted bit.

Referring again to FIG. 3, the function used by the encoder 74 to variably change the bit rate of the payload 62 may be received from a variety of different sources.

Figure 4:
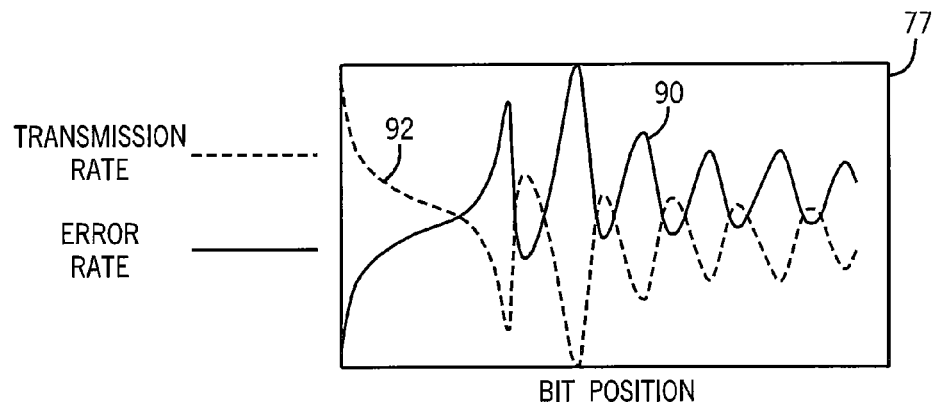
FIG. 4 is a graph showing bit errors as a function of bit position in a packet for a spread-spectrum transmission protocol.

Referring now to FIG. 4, a first option for controlling the bit rate using the encoder 74 employs a predefined error table 77 recording a statistical likelihood of errors as a function of bit position in the modified payload 62'. In this regard, the present inventors have monitored error rates as a function of bit position in the data packets 64 and noted a regular pattern of error rates 90. While the inventors do not wish to be bound by a particular theory, it is believed that low error rates near the beginning of the packet 64 occur because of the high degree of synchronization of the early data of the packet 64 being most proximate to the synchronization clock sequence (a timing pattern) of the header 68. Generally the synchronization clock sequence provides a "training set" that is predetermined and thus known by both the transmitter and receiver so as to be used by the receiver to adjust its reception circuitry with respect to the expected phase, frequency, and amplitude of the incoming signal. In addition, the present inventors have detected periodic spikes in error rates believed to be the result of the pattern of frequency hopping incident to spread-spectrum transmission that periodically moves the carrier frequency to the edge of the allotted bandwidth where interference is greatest. This empirically derived pattern of error rates 90 may be used to provide an exactly offsetting transmission rate 92 (held in error table 77 or computed therefrom) in which times of lowest error rates are associated with greatest effective transmission rates and times of highest error rate are associated with lower transmission rates. The transmission rate 92 may be used to guide the encoder 74. In this way, a higher effective throughput (measured as error-free bits of transmission) may be obtained more cost-effectively in terms of time and/or transmission energy.

Figure 9:
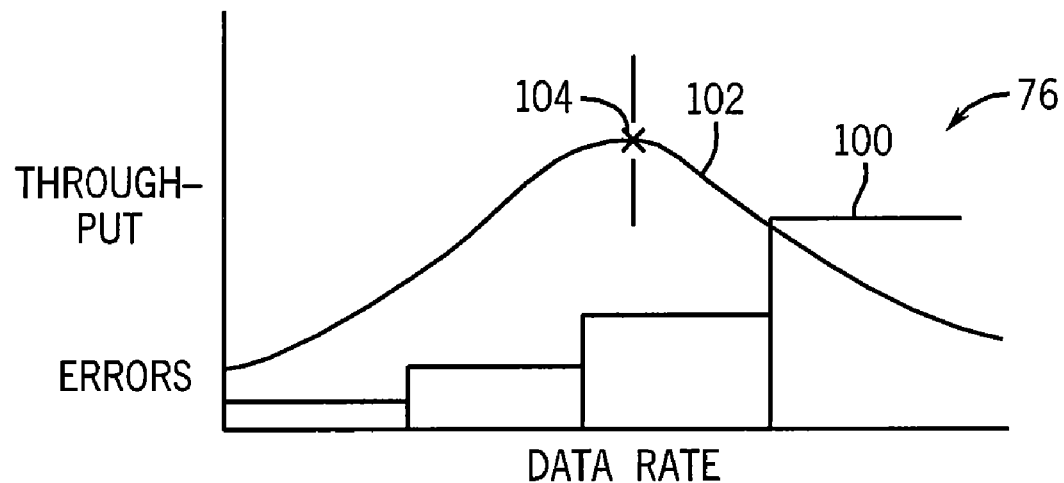
FIG. 9 is a plot of data collected by the transceiver showing errors as a function of bit rate in an individual packet.

Referring to FIG. 9, a second option for controlling the bit rate using the encoder 74 (which may be used alternatively or in addition to the first option) monitors error rates in received packets 64 as a function of bit position of the modified payload 62' and effective transmission rate as indicated by rate table 70. The errors are stored in the error-histogram 76 described above which generates an error plot 100 as a function of data rate (and bit position) for as little as a single packet 64 and thus on a very rapid basis.

The error plot 100 may extract from a single packet 64 a sampling of transmission rates and their resulting error rates. The error rates and data rates may be used to derive an error-free throughput curve 102 indicating the effective error-free transmission of data by the system. The peak 104 of this curve 102 defines an optimum data rate for the next transmitted packet 64.

Figure 10:
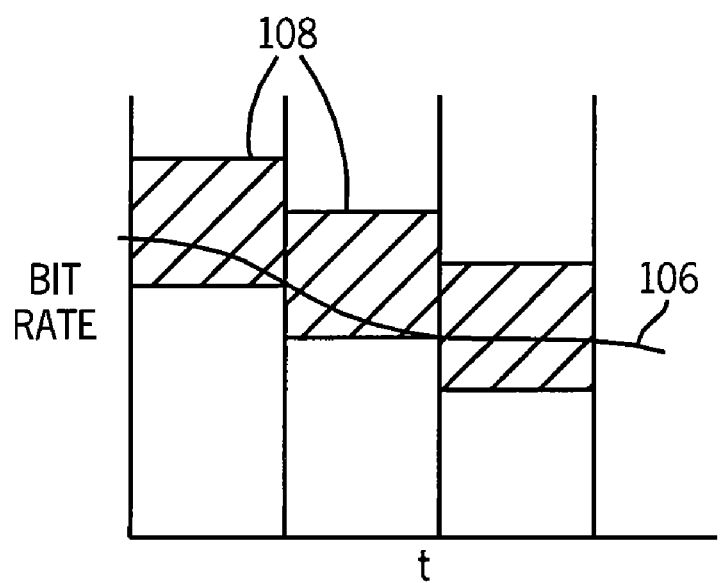
FIG. 10 is a plot of inter-packet rate adjustment guided by multi-rate packet measurements.

Referring to FIG. 10, the optimum frequency represented by the peak 104 of curve 102 from FIG. 9 may be used as a target transmission rate 106 for the encoder 74 that evolves with time. The target transmission rate 106 may define a center of the transmission rate of the modified payload 62' for the encoder 74 which may further vary the transmission rate of other bits of the unmodified payload 62 to be above and below the target transmission rate 106 as indicated by shaded regions 108. In this way, every packet 64 tests for the target transmission rate 106 providing extremely rapid compensation for changes in the bandwidth zones 20 (shown in FIG. 1).

Alternatively, the target transmission rate 106 may be used to adjust the transmission rate of the packet by modification of the transmitter of the transceiver circuitry 24 according to techniques known in the art.

The present invention providing for intra-packet rate modulation may be used in conjunction with inter-packet rate modulation (which directly affects the symbol transmission rate implemented by the transceiver circuitry 24) incorporated into various standards and often implemented in hardware.

Figure 11:
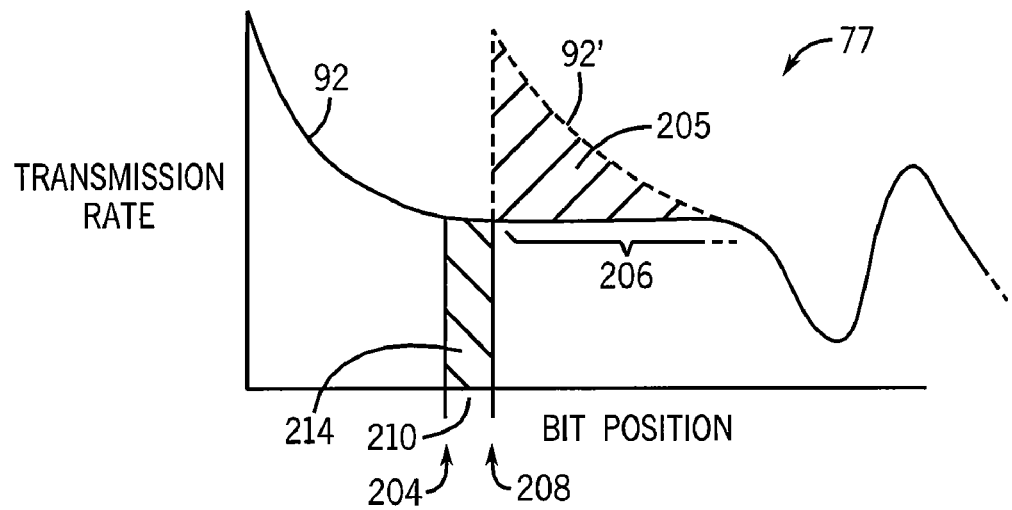
FIG. 11 is a figure similar to that of FIG. 4 showing transmission rate and a projected transmission rate based on the introduction of a new synchronization clock sequence in mid-packet.
Figure 12:
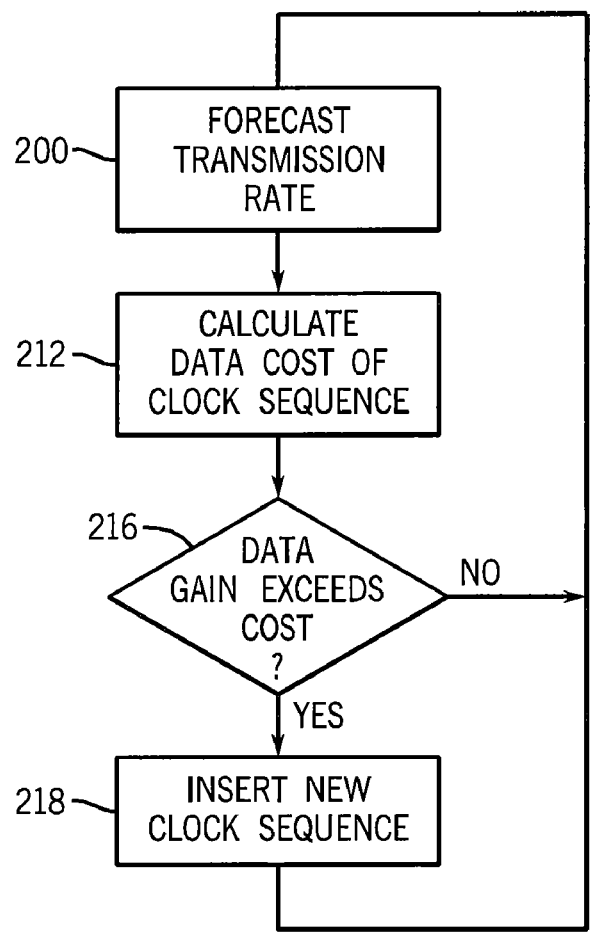
FIG. 12 is a flowchart of a program executed to assess points at which additional synchronization clock sequences may effectively be inserted into a packet.

Referring now to FIGS. 11 and 12, the data of the predefined error table 77, as concurrently refined, may be used to dynamically insert additional or augmenting synchronization clock sequences into the packets 64 in cases where the insertion provides for a net gain in effective transmission rate. In one embodiment, the offsetting transmission rate 92, for example, ay be used to guide the actual transmission rate of the encoder 74. In this case, as indicated by process block 200, at periodic times 202, the program 34 may forecast the transmission rate by extending the offsetting transmission rate 92 (calculated from the error rate 90 of error table 77) into the future as indicated by the solid line in region 206. Region 206 begins at a time 208 at which data transmission would resume, after a hypothetical synchronization clock sequence transmission period 210 occupied by a hypothetical augmenting synchronization clock sequence that might be inserted into the packet 64 at time 204.

Also at process block 200, a hypothetical transmission rate 92' is determined under the assumption that there has been an introduction of a synchronization clock sequence at time 204. The hypothetical transmission rate 92', indicated by the dotted line in region 206, may be derived from the offsetting transmission rate 92 by simply shifting the latter to align with time 208. An area 205 between the solid line of offsetting transmission rate 92 and the dotted line of hypothetical transmission rate 92' in region 206 represents a benefit in data transmission from the introduction of a synchronization clock sequence in period 210.

At process block 212, the cost in terms of lost data transmission caused by the introduction of a synchronization clock sequence at period 210 is also calculated as the area 214 beneath the offsetting transmission rate 92 during period 210.

At decision block 216, the areas 205 and 214 are compared and if the data gain represented by the difference between areas 205 and 214 exceeds a predetermined amount, a new synchronization clock sequence will be inserted at time 204 as indicated by process block 218. Otherwise the program 34 returns to process block 200 to compute these values for later bit position or time within the packet 64 (assuming the existence of any previously selected augmenting synchronization clock sequences).

While this process is described as if done contemporaneously with the transmission of data, it may also be done before the transmission of each packet 64 based on the expected offsetting transmission rate 92 for that packet 64.

The receiver may remove these additional synchronization clock sequences (added at process block 218) after using them to resynchronize the receiver, so as to extract the payload 62 being transmitted. The location of the added synchronization clock sequences may be marked by other header information to distinguish it from payload data.

It will be understood that this process may be used together with the above described variation in effective transmission rate according to the offsetting transmission rate 92 or maybe implemented without intra-packet adjustment of the transmission rate of the transmitter by using an estimate of the effective transmission rate without intra-packet adjustment taking into account retransmission. This estimate will generally have a steeper downward slope than offsetting transmission rate 92 caused by data lost in retransmission. In addition, it will be understood, that locations for augmenting synchronization clocks sequences may be predetermined and inserted into the packet on a regular basis or according to gross metrics such as total packet error rate and the like, by selecting from predetermined insertion schedules linked to particular packet error rates.

It is specifically intended that the present invention not be limited to the embodiments and illustrations contained herein and the invention should be understood to include modified forms of those embodiments including portions of the embodiments and combinations of elements of different embodiments as come within the scope of the following claims.

We claim:

1. A transceiver system providing for a transmission of packetized digital data wherein a packet consists of a data payload sharing common control information of the packet, the transceiver system comprising:
   (a) a transmitter circuit:
      (i) receiving a first data payload and a first rate map describing a desired transmission bit rate of the data payload, the desired transmission bit rate varying as a function of bit positions in the first data payload; and
      (ii) transmitting the first data payload according to the first rate map together with control information in a first packet; and
   (b) a receiver circuit:
      (i) receiving a second packet including a second data payload and control information; and
      (ii) decoding the second data payload according to a second rate map describing a transmission bit rate of the second data payload that varies as a function of bit positions in the second data payload.

2. The transceiver system of claim 1 wherein the transmitter circuit transmits the first rate map in the first packet and wherein the receiver receives the second rate map from the second packet.

3. The transceiver system of claim 1 wherein the transmitter circuit includes:
   an encoder circuit variably mapping payload data to transmission symbols according to the first rate map to produce a variable transmission bit rate; and
   wherein the receiver includes:
   a decoder circuit variably mapping received symbol data to payload data according to the second rate map to decode a transmitted second payload.

4. The transceiver system of claim 1 further including a statistical payload error table recording a statistical probability of errors as a function of bit position in a payload and wherein the rate map varies the bit rate of the first data payload according to the packet error table to reduce bit rates at bit positions having high statistical probability of error and to increase bit rate at bit positions having low statistical probability of errors.

5. The transceiver system of claim 1 wherein the transmitter and receiver are spread-spectrum transmitters and receivers.

6. The transceiver system of claim 1 further including an error detector detecting variation in error rates as a function of bit rate within a packet having different intra-packet bit rates and monitoring the function to deduce an improved error-corrected transmission rate and wherein the rate map encodes a payload according to the improved error-corrected transmission rate.

7. The transceiver system of claim 6 wherein the rate map varies the transmission bit rate within the first packet to provide transmission bit rates on either side of the improved transmission rate.

8. The transceiver system of claim 7 further including a statistical payload error table recording a statistical probability of errors as a function of bit position in a payload and wherein the rate map varies the transmission bit rate of the first data payload according to the packet error table to reduce bit rate at bit positions having high statistical probability of error and to increase bit rate at bit positions having low statistical probability of errors.

9. The transceiver system of claim 1 wherein the transmitter and receiver provide for a transmitted symbol constellation and the transmitter varies the transmission bit rate by using only a subset of symbols of the constellation, the subset size being a function of the desired transmission bit rate.

10. The transceiver system of claim 9 wherein the receiver further includes an error corrector re-mapping of data received at symbols outside of the subset to symbols within the subset.

11. The transceiver system of claim 10 wherein the re-mapping maps the symbols to a closest symbol within the subset.

12. A transceiver system providing for the transmission of packetized digital data, the transceiver system comprising:
   (a) a transmitter circuit providing for the transmission of data using a modulation system having a constellation of a first set of symbols;
   (b) a pre-processor connected to the transmitter circuit for receiving the first data to be transmitted by the transmitter circuit, the pre-processor variably mapping the data to be transmitted to a subset smaller than the first set of symbols according to the first rate map describing a desired transmission bit rate of the data and providing the mapped data to the transmitter circuit;
   (c) a receiver circuit providing for the reception of data using a demodulation system having a constellation of the first set of symbols; and
   (d) a post-processor connected to the receiver circuit for receiving data from the receiver circuit, the post-processor variably mapping the received data to a subset smaller than the first set of symbols according to a second rate map describing a transmission bit rate of the data received from the receiver that varies as a function of bit positions of the data received from the receiver.

13. The transceiver system of claim 12 wherein the transmitter and receiver work with data packets each consisting of a data payload sharing common control information of the packet, wherein further, the transmitter circuit transmits the first rate map as payload data of the first packet and wherein the receiver receives the second rate map from the control information of the second packet as payload data of the second packet.

14. The transceiver system of claim 12 wherein the pre-processor includes a statistical payload error table holding a statistical probability of errors as a function of bit position in a payload and wherein the first rate map reduces bit rates at bit positions of the transmitted data having high statistical probability of error and increases bit rate at bit positions of the transmitted data having low statistical probability of errors.

15. The transceiver system of claim 14 wherein the transmitter and receiver are spread-spectrum transmitters and receivers.

16. The transceiver system of claim 12 wherein the post-processor includes an error detector detecting and monitoring error packets from the receiver to deduce an improved error-corrected transmission rate and wherein the pre-processor selects a first rate map according to the improved error-corrected transmission rate.

17. The transceiver system of claim 16 wherein the pre-processor varies the transmission bit rate to provide transmission bit rates on either side of the improved transmission rate.

18. The transceiver system of claim 17 wherein the pre-processor includes a statistical payload error table holding a statistical probability of errors as a function of bit position in a payload and wherein the first rate map reduces bit rates at bit positions of the transmitted data having high statistical probability of error and increases bit rate at bit positions of the transmitted data having low statistical probability of errors.

19. The transceiver system of claim 12 wherein the post-processor further includes an error corrector re-mapping data received at constellation points outside of the subset to constellation points within the subset.

20. The transceiver system of claim 19 wherein the re-mapping maps the symbols to the closest symbol of the subset.

21. A transceiver system providing for a transmission of packetized digital data wherein a packet consists of a data payload sharing common control information of the packet, the control information including a synchronization clock sequence containing predetermined data known to a potential receiver allowing the receiver to adjust its reception circuitry with respect to an incoming signal, the transceiver system comprising:
 (a) a transmitter circuit:
  (i) receiving a first data payload and a model of effective transmission rate of the first data payload as a function of bit position after the synchronization clock sequence; and
  (ii) transmitting the first data payload with the insertion of augmenting synchronization clock sequences according to the model of effective transmission rate; and
 (b) a receiver circuit:
  (i) receiving a second packet including a second data payload and control information and augmenting synchronization clock sequences; and
  (ii) decoding the second data payload to remove the augmenting synchronization clock sequences after synchronizing the receiver circuit with the augmenting synchronization clock sequences.

22. The transceiver system of claim 21 wherein the transmitter circuit inserts of augmenting synchronization clock sequences when a predicted gain in data transmission resulting from the introduction of an augmenting synchronization clock sequence exceeds a predicted loss in data resulting from the introduction of the augmenting synchronization clock sequence at the time of the introduction.

23. The transceiver system of claim 21 wherein the model of effective transmission rate is updated periodically during transmission of packets.

24. The transceiver system of claim 21 wherein the transmitter circuit further receives a rate map describing a desired transmission bit rate of the data payload, the desired transmission bit rate varying as a function of bit positions in the data payload and wherein the model of effective transmission rate is the received first rate map; and
 wherein the transmitter transmits the first data payload according to the first rate map together with control information in a first packet.

\* \* \* \* \*